(12) United States Patent
Chen et al.

(10) Patent No.: US 8,903,359 B2
(45) Date of Patent: Dec. 2, 2014

(54) MOBILE DEVICE AND NFC SERVICE PROTECTION METHOD OF THE MOBILE DEVICE

(75) Inventors: Cho-Jan Chen, New Taipei (TW); Li-Yun Chen, New Taipei (TW)

(73) Assignee: Chi Mei Communication Systems, Inc., New Taipei (TW)

( * ) Notice: Subject to any disclaimer, the term of this patent is extended or adjusted under 35 U.S.C. 154(b) by 281 days.

(21) Appl. No.: 13/430,705

(22) Filed: Mar. 27, 2012

(65) Prior Publication Data

US 2012/0295588 A1    Nov. 22, 2012

(30) Foreign Application Priority Data

May 19, 2011    (TW) .............................. 100117504 A

(51) Int. Cl.
| | |
|---|---|
| *H04M 1/66* | (2006.01) |
| *H04W 4/00* | (2009.01) |
| *H04W 4/02* | (2009.01) |
| *H04W 12/06* | (2009.01) |
| *H04L 29/06* | (2006.01) |

(52) U.S. Cl.
CPC ........... *H04W 12/06* (2013.01); *H04L 63/0492* (2013.01); *H04W 4/008* (2013.01); *H04W 4/02* (2013.01)
USPC ....... 455/411; 455/41.1; 455/41.2; 455/556.2

(58) Field of Classification Search
CPC ........... H04W 8/16; H04W 8/20; H04W 8/24; H04W 12/00; H04W 12/02; H04W 12/04; H04W 12/08; H04W 12/12; H04W 48/02
USPC ................................................ 455/411, 556.2
See application file for complete search history.

(56) References Cited

U.S. PATENT DOCUMENTS

| 2009/0124234 A1* | 5/2009 | Fisher et al. ................... 455/406 |
| 2012/0094597 A1* | 4/2012 | Tysowski ..................... 455/41.1 |

FOREIGN PATENT DOCUMENTS

TW    200919354 A    5/2009

* cited by examiner

*Primary Examiner* — Amancio Gonzalez
(74) *Attorney, Agent, or Firm* — Novak Druce Connolly Bove + Quigg LLP

(57) ABSTRACT

In a near-field communication (NFC) service protection method of the mobile device, the mobile device includes an NFC controller, one or more security elements, a global positioning system (GPS) and a storage system. The method sets a security code for an NFC service of each of the security elements according to the geographic location of the mobile device as acquired by the GPS, and stores a security protection of the NFC service corresponding to each of the NFC services into the storage system. After an NFC service is selected from one of the security elements, and the NFC service is performed by executing an NFC application corresponding to the NFC service through the NFC controller. In addition, the method deletes the security code of the NFC service to disable the security protection of the NFC service when the NFC service needs to disable the security protection.

17 Claims, 5 Drawing Sheets

MOBILE DEVICE AND NFC SERVICE PROTECTION METHOD OF THE MOBILE DEVICE

BACKGROUND

1. Technical Field

The embodiments of the present disclosure relate to service protection systems and methods, and more particularly to a mobile device having a near-field communication (NFC) service protection function and an NFC service protection method of the mobile device.

2. Description of Related Art

NFC services are widely used in mobile devices, such as mobile phones, and PDA devices. The NFC services may be use include a touch service, a confirm service, a connection service, and a explorer service. With the exception of the touch and confirm services, the NFC protection just depends on a distance between a mobile device and another device. A downfall of NFC protection is that its encryption algorithm can be cracked very easily. If a user loses his/her the mobile device, anyone can use the mobile device to make an electronic payment. Therefore, it is desirable to have a mobile device having an NFC service protection function and an NFC service protection method of the mobile device, to address the above-mentioned problems.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
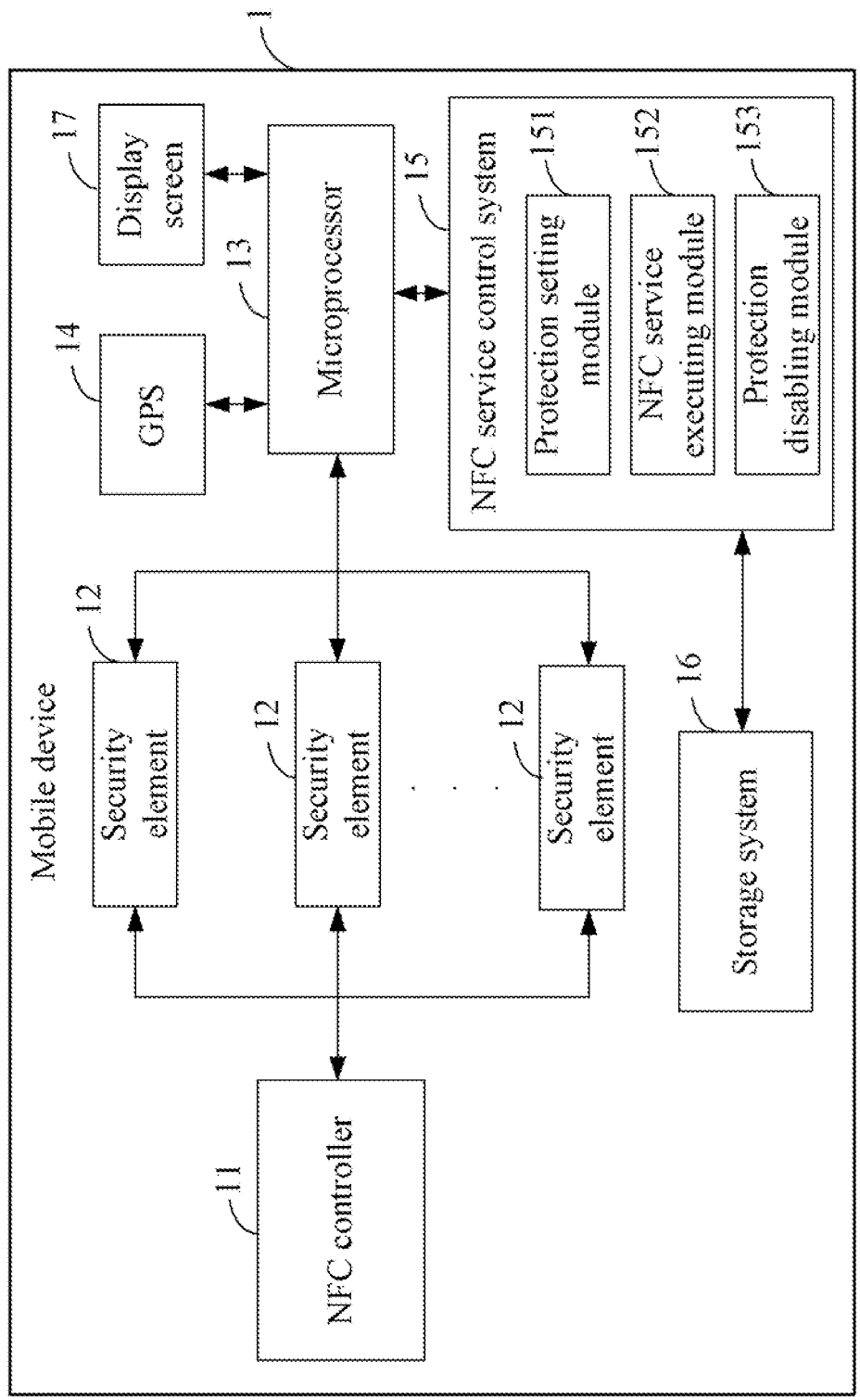
FIG. 1 is a block diagram of one embodiment of a mobile device including an NFC service control system.

FIG. 1 is a block diagram of one embodiment of a mobile device 1 including a near-field communication (NFC) service control system 15. In the embodiment, the mobile device 1 includes, but is not limited to, an NFC controller 11, one or more security elements 12, at least one microprocessor 13, a global positioning system (GPS) 14, a storage system 16, and a display screen 17. Each of the security elements 12 may be a subscriber identify module (SIM) card, a secure digital memory (SDM) card, or a secure access memory (SAM) card. Each of the security elements 12 connects to the NFC controller 11, and connects to the microprocessor 13. The GPS 14 and the NFC service control system 15 can communicate with the microprocessor 13. In one embodiment, the mobile device 1 may be a mobile phone, a personal digital assistant (PDA) device or any mobile communication device.

The NFC controller 11 is an integrated circuit (IC) chipset including an antenna circuit, and controls the mobile device 1 to perform one or more NFC services. In one embodiment, the NFC services include, but are not limited to, an electronic payment service facility, and an ID authentication service which might be used in a gate control system. Each of the security elements 12 stores one or more NFC applications, such as an electronic payment application, and an ID authentication application.

The microprocessor 13 executes the NFC applications stored in each of the security elements 12 to perform the NFC services. Each of the NFC applications corresponds to an NFC service. For example, the electronic payment application is executed to perform an electronic payment service, and the ID authentication application is executed to perform the ID authentication service. The GPS 14 acquires geographic location of the mobile device 1. The geographic location of the mobile device may include a current position of the mobile device 1.

The NFC service control system 15 may include a plurality of functional modules that are stored in the storage system 16 and executed by the at least one microprocessor 13. In one embodiment, the storage system 16 may be an internal storage system, such as a random access memory (RAM) for the temporary storage of information, and/or a read only memory (ROM) for the permanent storage of information. In some embodiments, the storage system 16 may also be an external storage system, such as an external hard disk, a storage chipset, or a data storage medium.

In one embodiment, the NFC service control system 15 includes a protection setting module 151, an NFC service executing module 152, and a protection disabling module 153. The modules 151-153 may comprise computerized instructions in the form of one or more programs that are stored in the storage system 12 and executed by the at least one microprocessor 13 to provide functions for implementing the modules. A detailed description of each module will be given.

In general, the word "module," as used herein, refers to logic embodied in hardware or firmware, or to a collection of software instructions, written in a programming language. In one embodiment, the program language may be Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, flash memory, and hard disk drives.

Figure 2:
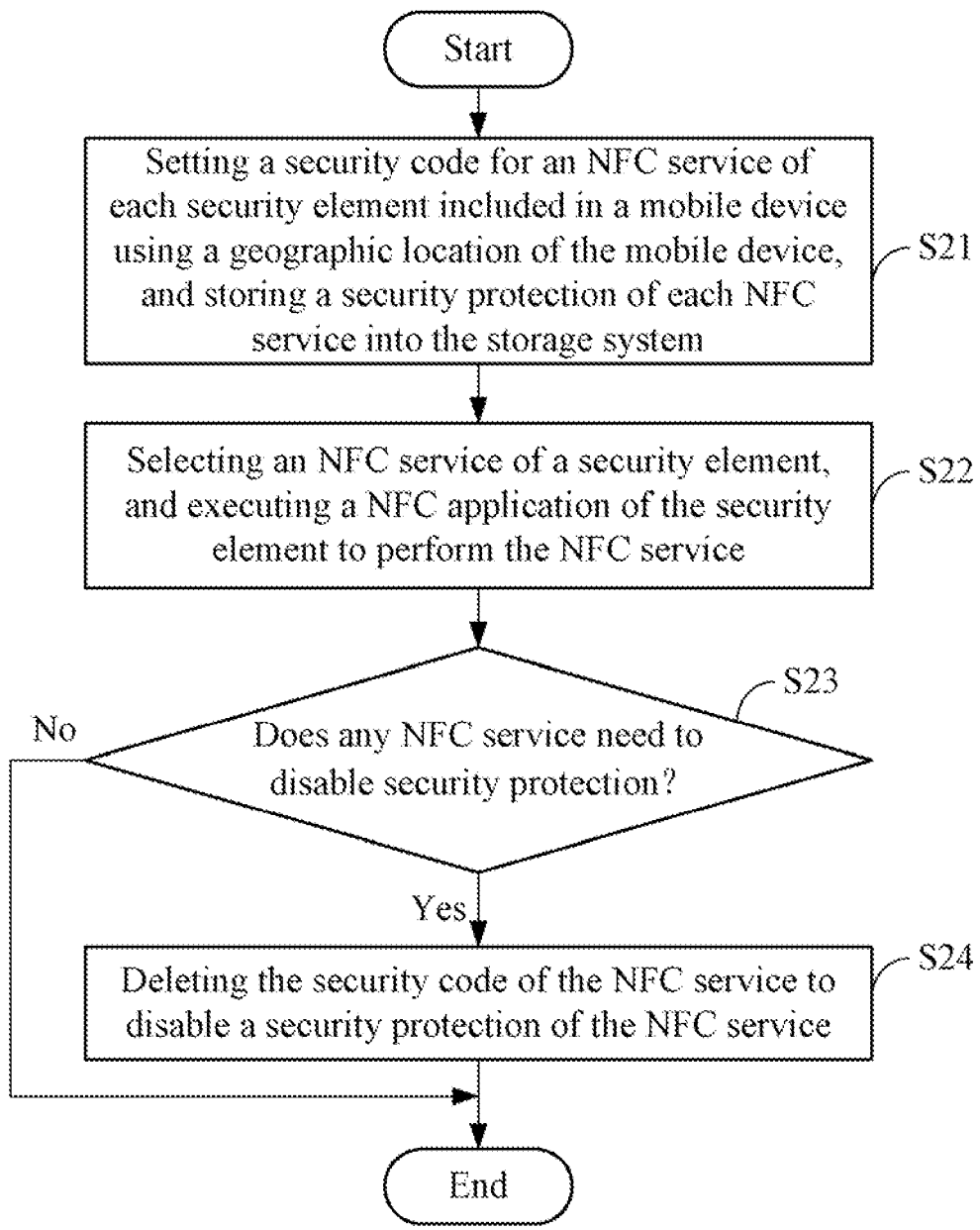
FIG. 2 is a flowchart of one embodiment of an NFC service protection method of the mobile device of FIG. 1.

FIG. 2 is a flowchart of one embodiment of an NFC service protection method of the mobile device 1 of FIG. 1. Depending on the embodiment, additional blocks may be added, others removed, and the ordering of the blocks may be changed.

In block S21, the protection setting module 151 sets a security code for an NFC service of each of the security elements 12 according to the geographic location of the mobile device 1, and stores a security protection of the NFC service corresponding to each of the NFC services into the storage system 16. In the embodiment, the security codes are set to protect the NFC services of the security elements 12 when the NFC services are operated by a user. The geographic location of the mobile device may include a current position of the mobile device 1 that is acquired by the GPS 14. Each of the security elements 12 has different security codes when the mobile device 1 locates at different positions. For example, if the mobile device 1 positions in location "A", the security code may be a first security code "A1". If the mobile device 1 positions in location "B", the security code may be a second security code "B1." The detailed description of block S21 will be described with reference to FIG. 3.

In block S22, the NFC service executing module 152 selects an NFC service (e.g., an electronic payment service) from one of the security elements 12 when the user inputs a selection command from the mobile device 1, and executes an NFC application of the security element 12 to perform the NFC service using the NFC controller 11. The detail description of block S22 will be described with reference to FIG. 4.

In block S23, the protection disabling module 153 determines whether any NFC service needs to disable the security protection of the NFC service. For example, if a NFC service (e.g., the ID authentication service) of the mobile device 1 needs to be performed, the protection disabling module 153 determines that the NFC service needs to disable the security protection of the NFC service. If any NFC service needs to disable the security protection, block S24 is implemented. Otherwise, if no NFC service needs to disable the security protection, the flow ends.

In block S24, the protection disabling module 153 deletes the security code of the NFC service from the security element 12 to disable the security protection of the NFC service. The detailed description of block S24 will be described with reference to FIG. 5.

Figure 3:
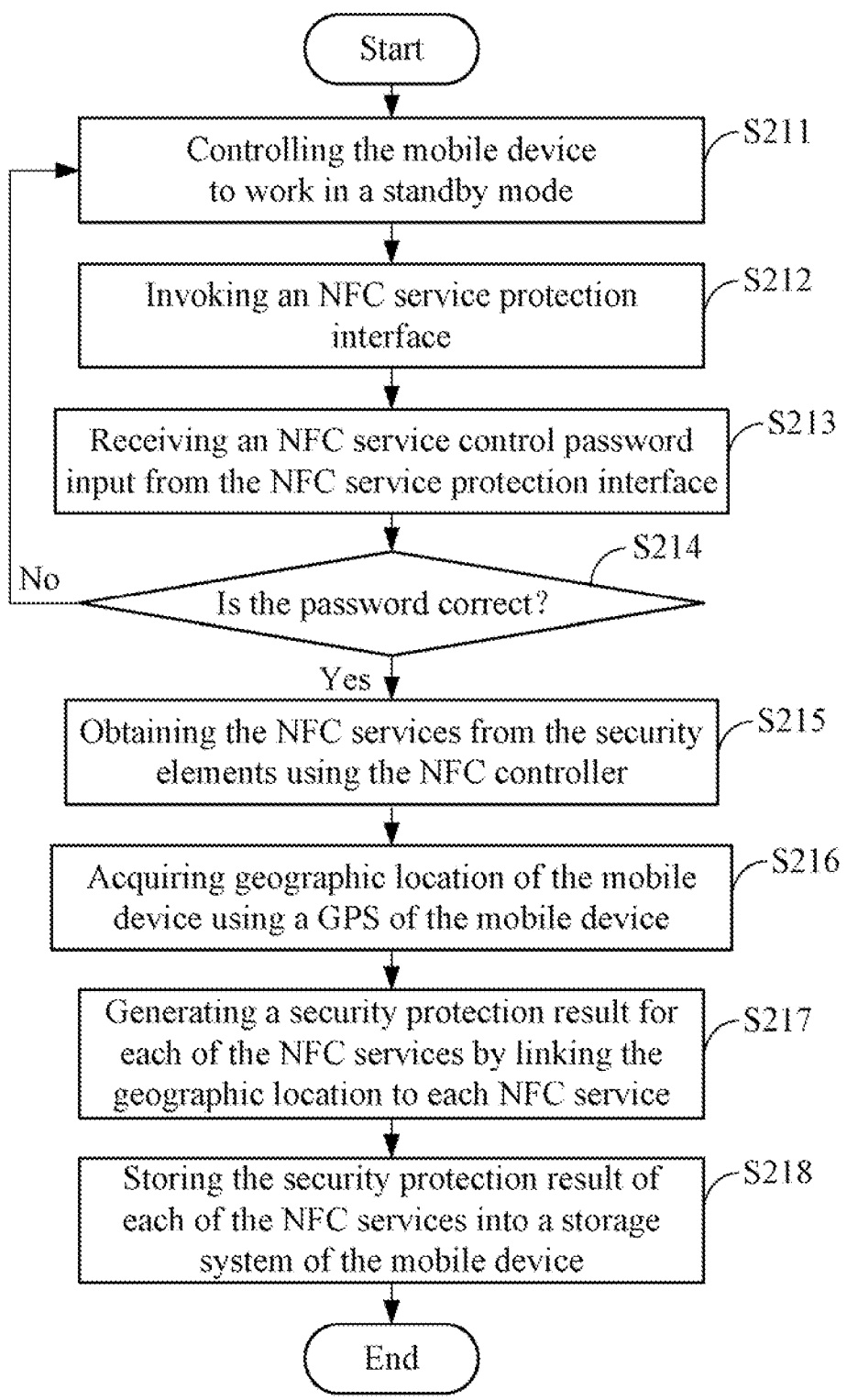
FIG. 3 is a detailed flowchart of block S21 of FIG. 2.

FIG. 3 is a detailed flowchart of block S21 of FIG. 2. In block S211, the microprocessor 13 controls the mobile device 1 to work in a standby mode when a user operates the NFC service using the mobile device 1. The standby mode is defined as a state of the mobile device 1 where the mobile device 1 waits for a user operation to be performed. In block S212, the protection setting module 151 invokes an NFC service protection interface displayed on the display screen 17. In block S213, the protection setting module 151 receives an NFC service control password from the NFC service protection interface input by the user.

In block S214, the protection setting module 151 determines whether the NFC service control password is correct. If the NFC service control password is correct, block S215 is implemented. Otherwise, if the NFC service control password is incorrect, block S211 is implemented.

In block S215, the protection setting module 151 obtains all the NFC services from the security elements 12 using the NFC controller 11. In block S216, the protection setting module 151 acquires geographic location of the mobile device 1 using the GPS 14. In the embodiment, the geographic location may include a current position of the mobile device 1.

In block S217, the protection setting module 151 generates a security protection result for each of the NFC services by linking the geographic location of the mobile device 1 to each of the NFC services. In block S218, the protection setting module 151 stores the security protection result into the storage system 16 of the mobile device 1.

Figure 4:
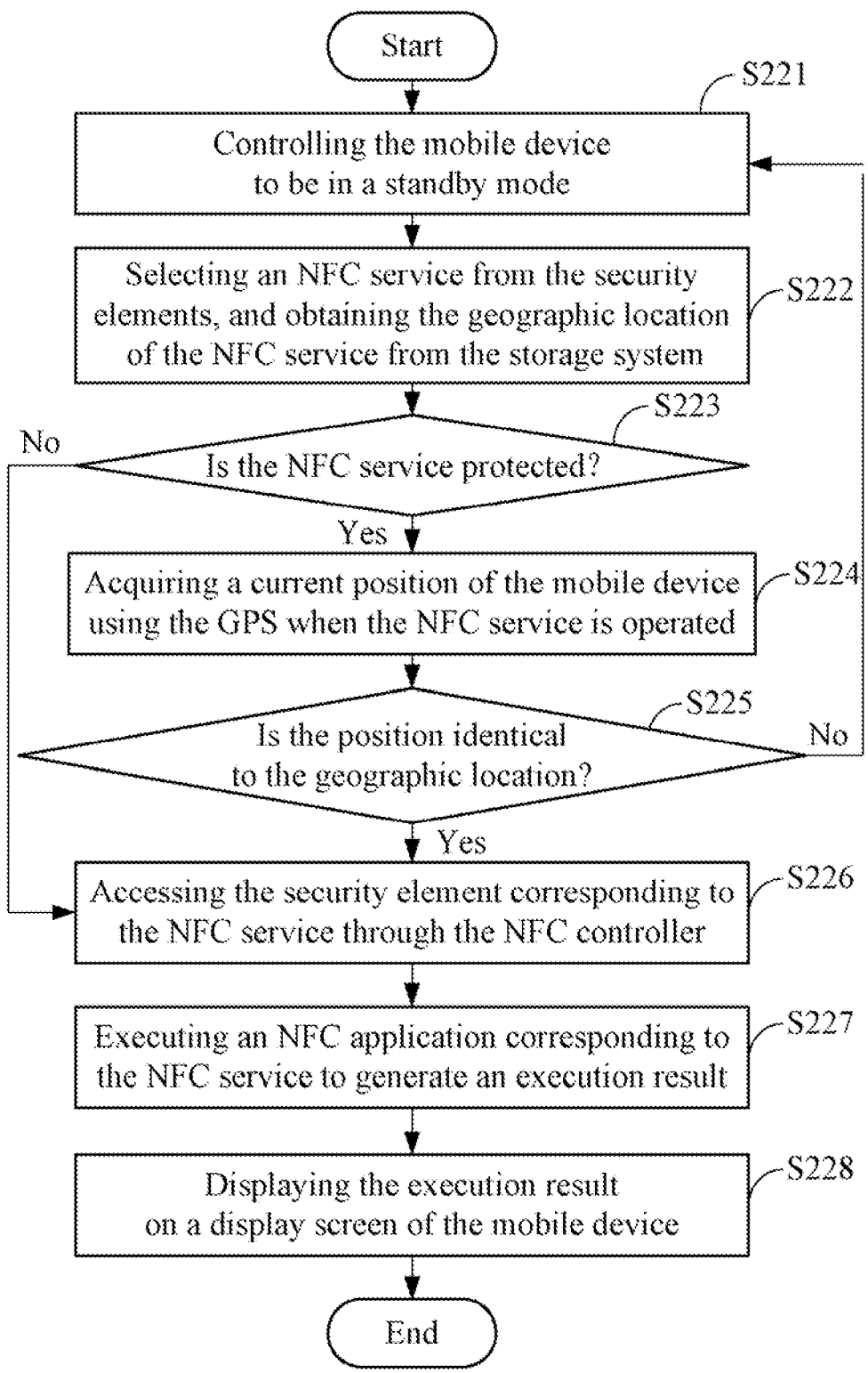
FIG. 4 is a detailed flowchart of block S22 of FIG. 2.

FIG. 4 is a detailed flowchart of block S22 of FIG. 2. In block S221, the microprocessor 13 controls the mobile device 1 to work in the standby mode when the user operates the NFC service using the mobile device 1.

In block S222, the NFC service executing module 152 selects an NFC service (e.g., an electronic payment service) from the security elements 12 through the NFC service protection interface, and obtains the geographic location of the NFC service from the storage system 16.

In block S223, the NFC service executing module 152 determines whether the NFC service is protected by the security code. If the NFC service is protected by the security code, block S224 is implemented. Otherwise, if the NFC service is not protected by the security code, block S226 is implemented.

In block S224, the NFC service executing module 152 acquires a current position of the mobile device 1 using the GPS 14 when the NFC service is operated by the user.

In block S225, the NFC service executing module 152 determines whether the current position matches the geographic location. If the current position is included matches the geographic location, block S226 is implemented. Otherwise, if the current position does not matches the geographic location, block S221 is implemented.

In block S226, the NFC service executing module 152 accesses the security element 12 corresponding to the NFC service through the NFC controller 11. In block S227, the NFC service executing module 152 performs the NFC service by executing an NFC application (e.g., an electronic payment service application) corresponding to the NFC service, and generates an execution result accordingly. In block S228, the NFC service executing module 152 displays the execution result on a display screen of the mobile device 1.

Figure 5:
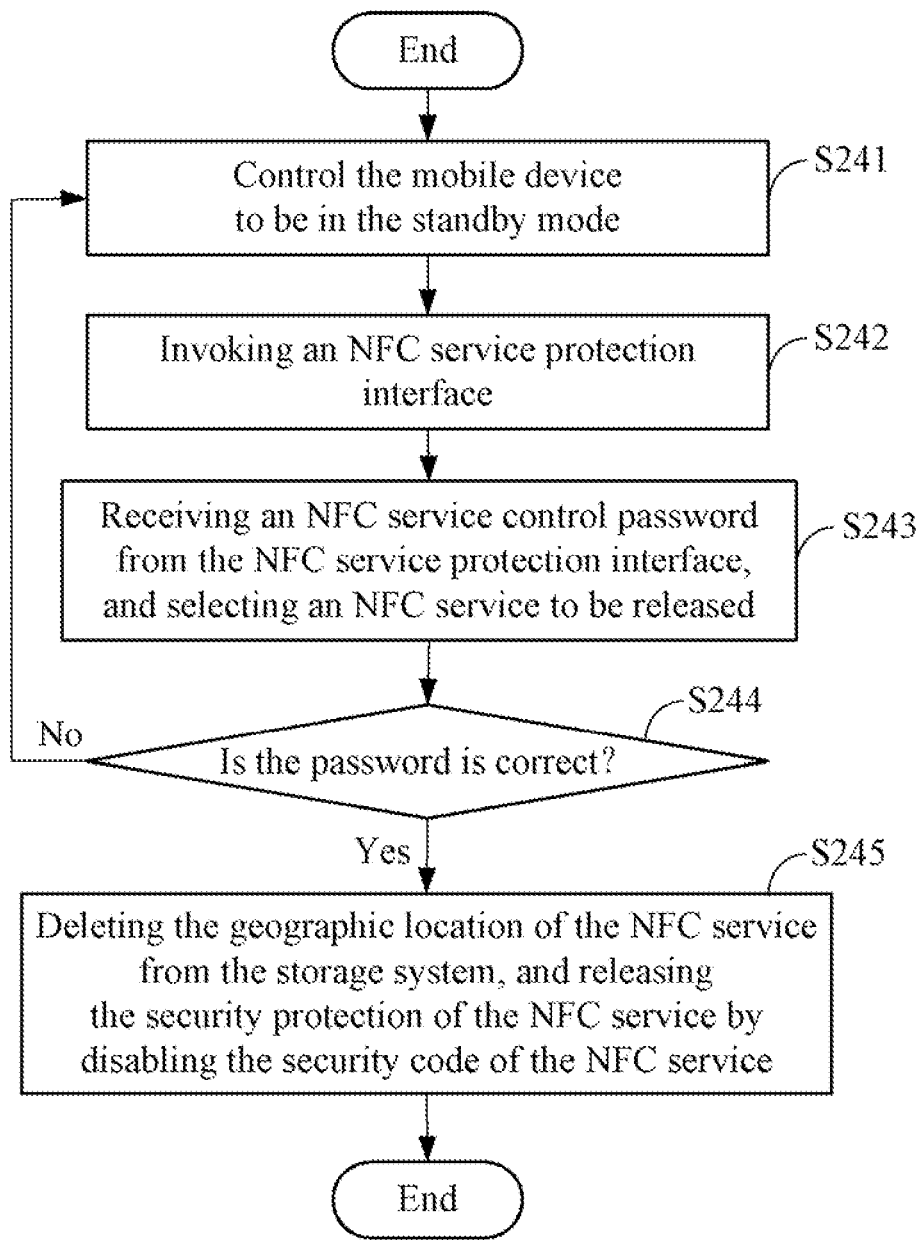
FIG. 5 is a detailed flowchart of block S24 of FIG. 2.

FIG. 5 is a detailed flowchart of block S24 of FIG. 2. In block S241, the microprocessor 13 controls the mobile device 1 to work in the standby mode when the user operates the NFC service using the mobile device 1.

In block S242, the protection disabling module 153 invokes an NFC service protection interface generated by the NFC service control system 15. In block S243, the protection disabling module 153 receives an NFC service control password input from the NFC service protection interface, and selects an NFC service (e.g., an electronic payment service) to be disabled from one of the security elements 12 through the NFC service protection interface.

In block S244, the protection disabling module 153 determines whether the input password is correct. If the input password is correct, block S245 is implemented. Otherwise, if the input password is incorrect, block S241 is implemented.

In block S245, the protection disabling module 153 deletes the geographic location of the NFC service from the storage system 16, and disables the security protection of the NFC service by deleting the security code of the NFC service from the selected security element 12.

All of the processes described above may be embodied in, and fully automated via, functional code modules executed by one or more general purpose processors of computing devices. The code modules may be stored in any type of non-transitory readable medium or other storage device. Some or all of the methods may alternatively be embodied in specialized hardware. Depending on the embodiment, the non-transitory readable medium may be a hard disk drive, a compact disc, a digital video disc, a tape drive or other suitable storage medium.

Although certain disclosed embodiments of the present disclosure have been specifically described, the present disclosure is not to be construed as being limited thereto. Various changes or modifications may be made to the present disclosure without departing from the scope and spirit of the present disclosure.

What is claimed is:

1. A near-field communication (NFC) service protection method of a mobile device, the mobile device comprising an NFC controller, one or more security elements, a global position system (GPS), a display screen and a storage system, the method comprising:
    (a) acquiring a geographic location of the mobile device using the GPS;
    (b) setting a security code for an NFC service of each of the security elements according to the geographic location of the mobile device, and storing a security protection of the NFC service corresponding to each of the NFC services into the storage system;
(c) selecting an NFC service from one of the security elements through an NFC service protection interface displayed on the display screen, and performing the NFC service by executing an NFC application stored in one of the security elements corresponding to the NFC service through the NFC controller;
(d) determining whether any NFC service needs to disable the security protection of the NFC service; and
(e) deleting the security code of the NFC service to disable the security protection of the NFC service if the NFC service needs to be disable the security protection, wherein the block (e) comprises:
receiving an NFC service control password input from the NFC service protection interface;
determining whether the input password is correct;
controlling the mobile device to work in a standby mode if the input password is incorrect;
deleting the geographic location of the NFC service from the storage system; and
deleting the security code of the NFC service from the security element to disable the security protection of the NFC service, if the input password is correct.

2. The method according to claim 1, wherein the block (b) comprises:
invoking the NFC service protection interface when a user operates the NFC service, and receiving an NFC service control password input from the NFC service protection interface;
determining whether the NFC service control password is correct;
controlling the mobile device to work in a standby mode if the NFC service control password is incorrect;
obtaining all the NFC services from the security elements using the NFC controller if the NFC service control password is correct;
generating a security protection result for each of the NFC services by linking the geographic location of the mobile device to each of the NFC services; and
storing the security protection result into the storage system.

3. The method according to claim 1, wherein the block (c) comprises:
obtaining the geographic location of the NFC service from the storage system;
determining whether the NFC service is protected by the security code;
acquiring a current position of the mobile device using the GPS if the NFC service is protected by the security code;
determining whether the current position matches the geographic location;
controlling the mobile device to work in a standby mode when the current position does not match the geographic location;
accessing the security element corresponding to the NFC service through the NFC controller if the current position matches the geographic location; and
executing an NFC application corresponding to the NFC service to generate an execution result, and displaying the execution result on the display screen.

4. The method according to claim 1, wherein the NFC controller is an integrated circuit (IC) chipset including an antenna circuit, and controls the mobile device to perform the NFC services.

5. The method according to claim 1, wherein the security elements comprise a subscriber identify module (SIM) card, a secure digital memory (SDM) card and a secure access memory (SAM) card, and each of the security elements stores one or more NFC applications.

6. The method according to claim 1, wherein the NFC services comprise an electronic payment service in a bus transport and an ID authentication service used in a gate control system, and each of the NFC services corresponds to an NFC application.

7. A mobile device, comprising:
a near-field communication (NFC) controller, one or more security elements, and a global position system (GPS);
a display screen, a storage system and at least one microprocessor; and
one or more programs stored in the storage system and executed by the at least one microprocessor, the one or more programs comprising:
a protection setting module operable to acquire geographic location of the mobile device using the GPS, set a security code for an NFC service of each of the security elements according to the geographic location of the mobile device, and store a security protection of the NFC service corresponding to each of the NFC services into the storage system;
an NFC service executing module operable to select an NFC service from one of the security elements through an NFC service protection interface displayed on the display screen, and perform the NFC service by executing an NFC application stored in one of the security elements corresponding to the NFC service through the NFC controller; and
a protection disabling module determine whether any NFC service needs to disable the security protection of the NFC service, and delete the security code of the NFC service to disable the security protection of the NFC service if the NFC service needs to disable the security protection, wherein the security protection of the NFC service is disabled by performing steps of:
receiving an NFC service control password input from the NFC service protection interface;
determining whether the input password is correct;
controlling the mobile device to work in a standby mode if the input password is incorrect;
deleting the geographic location of the NFC service from the storage system; and
deleting the security code of the NFC service from the security element to disable the security protection of the NFC service, if the input password is correct.

8. The mobile device according to claim 7, wherein the security protection of the NFC service is generated by steps of:
invoking the NFC service protection interface when a user operates the NFC service, and receiving an NFC service control password input from the NFC service protection interface;
determining whether the NFC service control password is correct;
controlling the mobile device to work in a standby mode if the NFC service control password is incorrect;
obtaining all the NFC services from the security elements using the NFC controller if the NFC service control password is correct;
generating a security protection result for each of the NFC services by linking the geographic location of the mobile device to each of the NFC services; and
storing the security protection result into the storage system.

9. The mobile device according to claim 7, wherein the security protection of the NFC service is performed by steps of:
- obtaining the geographic location of the NFC service from the storage system;
- determining whether the NFC service is protected by the security code;
- acquiring a current position of the mobile device using the GPS if the NFC service is protected by the security code;
- determining whether the current position matches the geographic location;
- controlling the mobile device to work in a standby mode when the current position does not match the geographic location;
- accessing the security element corresponding to the NFC service through the NFC controller if the current position matches the geographic location; and
- executing an NFC application corresponding to the NFC service to generate an execution result, and displaying the execution result on the display screen.

10. The mobile device according to claim 7, wherein the NFC controller is an integrated circuit (IC) chipset including an antenna circuit, and controls the mobile device to perform the NFC services.

11. The mobile device according to claim 7, wherein the security elements comprise a subscriber identify module (SIM) card, a secure digital memory (SDM) card and a secure access memory (SAM) card, and each of the security elements stores one or more NFC applications.

12. The mobile device according to claim 7, wherein the NFC services comprise an electronic payment service in a bus transport and an ID authentication service used in a gate control system, and each of the NFC services corresponds to an NFC application.

13. A non-transitory storage medium having stored thereon instructions that, when is executed by at least one microprocessor of a mobile device, causes the mobile device to perform a near-field communication (NFC) service protection method, the mobile device comprising an NFC controller, one or more security elements, a global position system (GPS), a display screen, and a storage system, the method comprising:
- (a) acquiring geographic location of the mobile device using the GPS;
- (b) setting a security code for an NFC service of each of the security elements according to the geographic location of the mobile device, and storing a security protection of the NFC service corresponding to each of the NFC services into the storage system;
- (c) selecting an NFC service from one of the security elements through an NFC service protection interface displayed on the display screen, and performing the NFC service by executing an NFC application stored in one of the security elements corresponding to the NFC service through the NFC controller;
- (d) determining whether any NFC service needs to disable the security protection of the NFC service; and
- (e) deleting the security code of the NFC service to disable the security protection of the NFC service if the NFC service needs to disable the security protection, wherein the block (e) comprises:
  - receiving an NFC service control password input from the NFC service protection interface;
  - determining whether the input password is correct;
  - controlling the mobile device to work in a standby mode if the input password is incorrect;
  - deleting the geographic location of the NFC service from the storage system; and
  - deleting the security code of the NFC service from the security element to disable the security protection of the NFC service, if the input password is correct.

14. The storage medium according to claim 13, wherein the block (b) comprises:
- invoking the NFC service protection interface when a user operates the NFC service, and receiving an NFC service control password input from the NFC service protection interface;
- determining whether the NFC service control password is correct;
- controlling the mobile device to work in a standby mode if the NFC service control password is incorrect;
- obtaining all the NFC services from the security elements using the NFC controller if the NFC service control password is correct;
- generating a security protection result for each of the NFC services by linking the geographic location of the mobile device to each of the NFC services; and
- storing the security protection result into the storage system.

15. The storage medium according to claim 13, wherein the block (c) comprises:
- obtaining the geographic location of the NFC service from the storage system;
- determining whether the NFC service is protected by the security code;
- acquiring a current position of the mobile device using the GPS if the NFC service is protected by the security code;
- determining whether the current position matches the geographic location;
- controlling the mobile device to work in a standby mode when the current position does not matches the geographic location;
- accessing the security element corresponding to the NFC service through the NFC controller if the current position matches the geographic location; and
- executing an NFC application corresponding to the NFC service to generate an execution result, and displaying the execution result on the display screen.

16. The storage medium according to claim 13, wherein the NFC controller is an integrated circuit (IC) chipset including an antenna circuit, and controls the mobile device to perform the NFC services.

17. The storage medium according to claim 13, wherein the security elements comprise a subscriber identify module (SIM) card, a secure digital memory (SDM) card and a secure access memory (SAM) card, and each of the security elements stores one or more NFC applications.

* * * * *